(12) United States Patent
Kizhner et al.

(10) Patent No.: US 10,996,396 B2
(45) Date of Patent: May 4, 2021

(54) ENDCAP, ASSEMBLY AND METHOD FOR IMPROVING ACCURACY IN FIBER-ENDCAP-FIXTURE ALIGNMENT

(71) Applicant: ELBIT SYSTEMS ELECTRO-OPTICS - ELOP LTD., Rehovot (IL)

(72) Inventors: Semion Kizhner, Rehovot (IL); Amir Hertzog, Rehovot (IL); Rina Cohen, Rehovot (IL); Daniel Wormser, Rehovot (IL); Tal Regev, Rehovot (IL)

(73) Assignee: ELBIT SYSTEMS ELECTRO-OPTICS - ELOP LTD., Rehovot (IL)

( * ) Notice: Subject to any disclaimer, the term of this patent is extended or adjusted under 35 U.S.C. 154(b) by 0 days.

(21) Appl. No.: 16/959,586

(22) PCT Filed: Dec. 31, 2018

(86) PCT No.: PCT/IL2018/051421
§ 371 (c)(1),
(2) Date: Jul. 1, 2020

(87) PCT Pub. No.: WO2019/130322
PCT Pub. Date: Jul. 4, 2019

(65) Prior Publication Data
US 2020/0386945 A1     Dec. 10, 2020

(30) Foreign Application Priority Data

Jan. 1, 2018  (IL) .......................... 256688

(51) Int. Cl.
*G02B 6/24*     (2006.01)
*G02B 6/26*     (2006.01)
(Continued)

(52) U.S. Cl.
CPC ............. *G02B 6/241* (2013.01); *G02B 6/262* (2013.01); *G02B 6/32* (2013.01); *G02B 6/36* (2013.01);
(Continued)

(58) Field of Classification Search
CPC .......... G02B 6/241; G02B 6/262; G02B 6/32; G02B 6/36; G02B 6/322; G02B 6/3803; G02B 6/3861; G02B 6/4296
(Continued)

(56) References Cited

U.S. PATENT DOCUMENTS 5,568,578 A    10/1996 Ames
5,937,123 A    10/1999 Frelier
(Continued)

FOREIGN PATENT DOCUMENTS

CA         1306883 C    9/1992
CN       202886656 U    4/2013
(Continued)

*Primary Examiner* — Michael P Mooney
(74) *Attorney, Agent, or Firm* — Browdy and Neimark, P.L.L.C.

(57) ABSTRACT

The present invention, disclose an endcap comprising: a. a first part being at least partially symmetrical about a main axis, said first part being fused to an optical fiber at a proximal end thereof such that said main axis is alignable with an optical axis of the optical fiber beam; and, b. a second part connecting to said first part at a distal end of said first part, wherein said second part protrudes from said first part, such that said second part forms a protruding bonding area, which is perpendicular to said main axis, for attaching said endcap to a fixture attachment area of a fixture apparatus, said fixture attachment area is perpendicular to said main axis, wherein said endcap is inserted at least partially inside said fixture apparatus, whereby, said endcap keeps said optical fiber beam aligned and minimizes angular diversion from an original alignment.

20 Claims, 8 Drawing Sheets

(51) Int. Cl.
*G02B 6/32* (2006.01)
*G02B 6/42* (2006.01)
*G02B 6/36* (2006.01)
*G02B 6/38* (2006.01)

(52) U.S. Cl.
CPC ......... *G02B 6/3861* (2013.01); *G02B 6/4296* (2013.01)

(58) Field of Classification Search
USPC ............. 385/31, 33, 38, 134, 39, 51, 76–87, 385/95–98
See application file for complete search history.

(56) References Cited

U.S. PATENT DOCUMENTS

| | | | |
|---|---|---|---|
| 6,625,351 B2 * | 9/2003 | Cox | B29C 41/20 385/31 |
| 7,306,376 B2 | 12/2007 | Scerbak et al. | |
| 7,580,609 B1 | 8/2009 | Pannell | |
| 2002/0131699 A1 | 9/2002 | Raguin | |
| 2012/0014649 A1 | 1/2012 | Duis et al. | |

FOREIGN PATENT DOCUMENTS

| | | |
|---|---|---|
| CN | 103399381 A | 11/2013 |
| CN | 103676051 A | 3/2014 |
| CN | 105652462 A | 6/2016 |
| CN | 105717578 A | 6/2016 |
| CN | 205608247 U | 9/2016 |
| DE | 102009025556 A1 | 12/2010 |
| JP | H06102436 A | 4/1994 |
| JP | 2003131067 A | 5/2003 |
| JP | 2006209085 A | 8/2006 |
| JP | 2013205573 A | 10/2013 |
| JP | 2014010427 A | 1/2014 |
| KR | 101404652 B1 | 6/2014 |
| WO | 2013083275 A1 | 6/2013 |

\* cited by examiner

```
┌─────────────────────────────────────────────────────────┐
│ Engaging the endcap and the fixture such that they      │
│ are substantially aligned with the main axis (e.g. by   │
│ placing the endcap inside the fixture forming a gap     │
│ "G" between the endcap bonding area and the             │
│ counter-facing engagement area of the fixture      71   │
└─────────────────────────────────────────────────────────┘
                            │
                            ▼
┌─────────────────────────────────────────────────────────┐
│ (Optional) Placing shims in the gap for mechanically    │
│ maintaining the same gap "G" throughout the             │
│ periphery of the gap.                              72   │
└─────────────────────────────────────────────────────────┘
                            │
                            ▼
┌─────────────────────────────────────────────────────────┐
│ Introducing (e.g. injecting) bonding material into      │
│ the gap "G", while continuously inspecting the          │
│ alignment quality (e.g. by optically examining          │
│ alignment related properties of an output beam of       │
│ the fiber connected to the endcap)                 73   │
└─────────────────────────────────────────────────────────┘
                            │
                            ▼
┌─────────────────────────────────────────────────────────┐
│ Hardening the bonding material e.g. through a           │
│ curing process                                     74   │
└─────────────────────────────────────────────────────────┘
                            │
                            ▼
┌─────────────────────────────────────────────────────────┐
│ (Optional) Removing the shims                      75   │
└─────────────────────────────────────────────────────────┘
```

FIGURE 5

(Section B-B)

ENDCAP, ASSEMBLY AND METHOD FOR IMPROVING ACCURACY IN FIBER-ENDCAP-FIXTURE ALIGNMENT

FIELD OF THE INVENTION

The present invention generally relates to systems and methods for optical fibers and more particularly, to endcaps and endcap assemblies for optical fibers, and systems and methods for improving accuracy in fiber-endcap-fixture alignment and therefore improving line-of-sight (LOS) retention.

BACKGROUND OF THE INVENTION

Endcaps are commonly used for high power laser fibers for reducing output power density and for avoiding or reducing possible damages that may occur at the interface between the output beam and the interfacing medium or device, such as fiber-air interface. Endcaps are attached to the optical fiber usually by fusing the endcap (proximal) edge to the fiber end surface. Known in the art fusion techniques are fusion splicing or laser fusion.

Known in the art endcaps can be generally divided to two main groups: endcaps having a waveguide inner core and a cladding surrounding the core; and coreless endcaps. To allow collimating the optical fiber output beam, some endcaps have a lensed shaped edge (the edge that is not fused to the fiber). These endcaps can be shortly referred to as "collimator endcaps" and are typically designed such that the lensed shaped edge is an integral part of the endcap. Non-collimating endcaps are typically cylindrical having a flattened surface at their distal edge.

The endcap fused to the optical fiber is often fixated by using a fixture device such as a ferrule or a mechanical holder. The endcap connecting (fused) to the fiber is typically placed inside the fixture in a coaxial manner about the fiber and endcap main axis to create an alignment over that main axis between the fixture, the endcap and the fiber output beam. To connect the outer surface of the endcap to the inner side of the fixture, adhesive material is injected to a small peripheral gap between the fixture inner face and the endcap outer face for bonding thereof. This adhesive material is then hardened e.g. by using curing methods. This parallel attachment between the ferrule and endcap is very sensitive to external forces and effects such as temperature changes or trembling of the ferrule-endcap-fiber assembly, and causes (over time) angular shifts i.e. diversion of the output beam in respect to the endcap and/or fixture axis. In some cases, an alignment shift of the endcap, in respect to the fixture position, of a few micrometers (μm) will cause an angular retention of a few hundreds of micro-radians (μRad). Such angular shift scales can be critical for some optical systems such as in systems using high-power transmission.

One example for high-power optical systems requiring high alignment accuracy is laser optical cavities (optical resonators) performing parametric cavity enhancement (parametric transformation).

Some known in the art endcaps designs are shown in FIGS. 1A and 1B, wherein FIG. 1A shows a non-collimating endcap 10 fused to an optical fiber 11 at a proximal end thereof attached to a ferrule fixture 12 in a parallel attachment by bonding thereto via a bonding material 13; and FIG. 1B shows a collimator endcap 20 fused to an optical fiber 21 at a proximal end thereof attached to a ferrule fixture 22 in a parallel attachment by bonding thereto via a bonding material 23. The endcaps 10 and 20 are coaxially fused to their respective fibers 11 and 21 about their respective main axes y1 and y2.

The endcap 10 is a simple cylindrical endcap having flat end surfaces being symmetrical about the cylinder main axis y1. The collimator endcap 20 has one proximal flat end fused to the fiber 21, where its distal end is curved and lens-shaped, being symmetrical about the cylinder axis y2.

For example, as shown in FIG. 1A, the diameter of the optical fiber d1 typically ranges between 50-250 μm (micrometers) while the diameter of the endcap d2 typically ranges between 250-1500 μm (micrometers). The ratio between d2 and d1 i.e. d2/d1 is typically close to 1 and smaller than 2, so that that the maximum diameter "d2max" of the endcap is typically fairly close to the diameter d1 of the optical fiber. The gap G1 between the ferrule 12 and the endcap 10 is typically in the range of 100 μm (micrometers).

Patent application No. CN103399381A discloses an optical fiber laser outputting head, which comprises an outputting optical fiber, an end cap, an optical fiber guide sleeve and a guide sleeve fixing seat. The end cap is arranged on the tail end of the outputting optical fiber and is used for carrying out optimization treatment on output of the outputting optical fiber; the optical fiber guide sleeve is used for guiding the outputting optical fiber, and the outside end surface of the optical fiber guide sleeve is aligned with or slightly higher than the outside end surface of the end cap; the guide sleeve fixing seat is used for fixing the optical fiber guide sleeve, and a first fixing structure for movably fixing the outputting optical fiber is arranged on the guide sleeve fixing seat. By adopting the optical fiber laser outputting head, the fixed cooling on the outputting optical fiber is realized according to the matching structure of the end cap and the optical fiber guide sleeve, the isolation degree of the optical fiber laser outputting head is promoted, the loss of the optical fiber laser outputting head is reduced, and meanwhile the maintenance cost of the optical fiber laser outputting head is lower.

Patent application No. CN205608247U discloses an optic fiber end cap holder for self-adaptation optical collimator. Whole optic fiber end cap holder is the whole of a boring, including five parts, follows the base and begins, is optic fiber end cap post in proper order and distinguishes fixed area, optic fiber end cap awl district fixed area, incision and optic fiber stability region, and the fine one end of optic fiber end cap tape trailer is followed optic fiber end cap holder base one end and is assembled to the removal of optic fiber stability region. The center gripping of stabilizing to the optic fiber end cap is realized to this holder, realizes stability and reliable assembly with the self-adaptation optical collimator based on flexible hinge. The advantage that has the reliability height, can freely load and unload with self-adaptation optical collimator. Processing is convenient, and the dependable performance does not have the special requirement to experimental environment and instrument and equipment.

Patent application No. CN105717578A discloses an optical fiber end cap clamp for an adaptive optical fiber collimator. The whole optical fiber end cap clamp is a hollow integral and comprises five parts including a base, an optical fiber end cap column zone fixing zone, an optical fiber end cap cone zone fixing zone, a notch and an optical fiber stabilizing zone in sequence, wherein the end, with a pigtail, of an optical fiber end cap moves towards the optical fiber stabilizing zone from the end, with the base, of the optical fiber end cap clamp for assembling. The clamp can stably clamp the optical fiber end cap, and the clamp and the adaptive optical fiber collimator based on a flexible hinge can be stably and reliably assembled. The optical fiber end cap clamp has the advantages that the reliability is high, and the optical fiber end cap clamp and the adaptive optical fiber collimator can be freely assembled or disassembled.

Utility model No. CN202886656U discloses an optical fiber coupling structure capable of adopting a movable optical fiber connector. The optical connector can be inserted into or unplugged from one end of an optical fiber connector socket conveniently. The other end of the socket is provided with a lens or a lens group capable of focusing shaped laser beams in the laser module on an optical fiber end face of the movable fiber connector, thereby realizing optical fiber coupling. The optical fiber connector socket is fixed in a groove in the surface of a support. The support is installed on a heat dissipating bottom board of a laser.

Patent application No. DE102009025556A1 discloses a light conducting cable-plug connector for coupling and uncoupling of high-power laser radiation into fiber optical waveguide, that has cavity formed between intermediate pipe outer side and outer pipe inner side to allow flow of cooling medium. The connector has a tubular component with a copper inner pipe, an intermediate pipe and an outer pipe. The inner and intermediate pipes are form-fittingly connected to each other.

Patent application No. WO13083275A1 discloses a light guide comprising an optical fiber; a ferrule that has a first through-opening through which the optical fiber is led such that a front portion of the optical fiber projects beyond the ferrule; comprising an end cap that is connected to the end of the front portion of the optical fiber, wherein the end cap end surface further away from the optical fiber is used as an incoupling or outcoupling point for laser radiation to be guided in the optical fiber; and comprising a support that has a second through-opening with a first and a second region.

U.S. Pat. No. 7,580,609B discloses a fiber intensity reducer comprising a guided system fiber including a core and an outer cladding layer, an unguided fiber intensity reducing (FIR) section including a first fiber end cap fiber having a first end and a second end attached at its first end to the system fiber. A bond region is located between the first end of the first fiber and the system fiber. The FIR section provides a softening point of at least 700 degrees centigrade throughout and provides a sufficient transverse dimension along its entire length so that a beam of radiation received from the system fiber expanding therein avoids an interface with the air along its entire length. In one arrangement, the FIR section includes an outer capillary on the end cap fiber, wherein the capillary and the end cap fiber provide refractive index matching.

Patent application No. CN103676051A discloses a myriawatt-level high-power optical fiber end cap, which comprises an optical fiber, a mode stripper, a quartz block and a shell. The optical fiber penetrates the mode stripper, a coating-removed optical fiber is arranged in the middle of the optical fiber and arranged in the mode stripper, a cooling cavity is arranged in the shell. The mode stripper is arranged in the cooling cavity, the quartz block is embedded on the end portion of the shell, one end of the quartz block is arranged in the cooling cavity of the shell and welded with the optical fiber while the other end of the same is arranged outside the shell, and the end portion of the quartz block is provided with a window film.

Patent application No. JP2013205573A discloses an optical fiber end cap junction structure that includes an optical fiber and an end cap to which one fiber end surface of the optical fiber is fused and joined. The structure further includes a coating member which covers the end part on the junction side of the optical fiber and is fused and joined to the end cap together with the optical fiber.

Patent application no. CN105652462A discloses a large-power optical fiber collimator system with a cladding light filtering-out function. The large-power optical fiber collimator system comprises a double-cladding optical fiber output tail fiber, a glass optical fiber end cap and a clamp thereof, a collimating lens and a packaging device, and a water cooling circulation assembly. The glass optical fiber end cap and the clamp thereof include the glass optical fiber end cap and the end cap clamp. The collimating lens and the packaging device include the collimating lens and a collimating lens packaging clamp. A fiber core of the double-cladding optical fiber output tail fiber is connected with the glass optical fiber end cap through welding. The end cap clamp and the collimating lens packaging clamp in the collimating lens and the packaging device are connected through threads. The collimating lens is utilized to filter out cladding light.

U.S. Pat. No. 5,937,123A discloses an optical fiber alignment device with a collimating lens, which includes a ferrule for receiving the optical fiber; a ball having an axial hole for receiving the ferrule; a housing having a socket in one end for receiving the ball; and a lens barrel in the opposite end for receiving a lens sleeve. A compression ring for urging the ball into the socket is forced by a first spring located to apply a compression force to the compression ring by an end cap. A channel in the housing allows for the introduction of a bonding agent to bond the ball in the socket to maintain a desired position after adjustment. A lens fixed in a lens sleeve is located in the lens tube at a position to collimate light exiting from the optical fiber. A second spring located between the lens sleeve and the lens barrel urges the lens sleeve out of the barrel and a channel in the housing is provided for introducing a bonding agent to bond the lens sleeve in the lens barrel to maintain the desired position.

Patent application No. KR101404652B discloses an optical fiber which transmits an optical fiber laser by the total internal reflection, an end cap which is mounted on the output terminal of the optical fiber and has a larger diameter than the optical fiber to reduce the output of the optical fiber laser per unit area, and a ferrule which covers and supports the optical fiber and is made of a metallic material. The ferrule includes a hollow part which receives the optical fiber, an end part which has a larger diameter than the hollow part to place the end cap therein. Provided is an optical fiber laser output apparatus which includes a receiving groove which is interlinked with the hollow part.

U.S. Pat. No. 7,306,376B discloses a monolithic ferrule/endcap/optical fiber structure wherein an optical fiber is terminated in a ferrule and bonded by fusion to form a monolithic unit which minimizes optical loss and is typically capable of transmitting high power laser radiation, preferably on the order of 500 W and higher, without damage to the optical fiber and ferrule. Ferrule, endcap, optical fiber and fusible powder are composed of material of substantially the same physical characteristics such that, when all are fused together, the structure so formed is monolithic and the optical path is transparent.

SUMMARY OF THE INVENTION

In accordance with some embodiments of the present invention, there is thus provided an endcap comprising:
a. a first part being at least partially symmetrical about a main axis, said first part being fused to an optical fiber at a proximal end thereof such that said main axis is alignable with an optical axis of the optical fiber beam; and b. a second part connecting to said first part at a distal end of said first part, wherein said second part protrudes from said first part, such that said second part forms a protruding bonding area, which is perpendicular to said main axis, for attaching said endcap to a fixture attachment area of a fixture apparatus, said fixture attachment area is perpendicular to said main axis, wherein said endcap is inserted at least partially inside said fixture apparatus, whereby, said endcap keeps said optical fiber beam aligned and minimizes angular diversion from an original alignment.

Furthermore, in accordance with some embodiments of the present invention, the endcap and said fixture apparatus are held in a manner that the surface of the protruding bonding area of the endcap is bonded to the counter facing surface of the fixture attachment area by a bonding material in a manner that allows thermal expansion movements of said bonding material along said optical axis.

Furthermore, in accordance with some embodiments of the present invention, the second part is lens-shaped at a distal end thereof, forming a collimator for collimating the optical fiber beam.

Furthermore, in accordance with some embodiments of the present invention, the the second part comprises:
  a body symmetrically arranged about said main axis; and
  at least one protruding member integrally connected to said body, over an outer periphery of said body, said at least one protruding member protrudes perpendicularly to said main axis,
    wherein said protruding member forms the bonding area of said second part.

Furthermore, in accordance with some embodiments of the present invention, the at least one protruding member of said second part is a single annular ring connected to the outer periphery of said body.

Furthermore, in accordance with some embodiments of the present invention, the protruding member of said second part comprises multiple protruding wings each forming a bonding area, which is perpendicular to said main axis, wherein said protruding wings are symmetrically arranged about said main axis and are spaced from one another.

Furthermore, in accordance with some embodiments of the present invention, the body of said second part has a lensed shaped edge for collimating the optical fiber beam.

Furthermore, in accordance with some embodiments of the present invention, the body of said second part is cylindrical having flattened edges.

Furthermore, in accordance with some embodiments of the present invention, all parts of said endcap form a single piece made of the same material.

Furthermore, in accordance with some embodiments of the present invention, the endcap is made of a transparent material.

Furthermore, in accordance with some embodiments of the present invention, the bonding material is one of the list of: silicon based material, SiO2, UV curable material, BK7, fluoride based glass, Caf, Chalcogenide based glasess, AsS, AsSe.

Furthermore, in accordance with some embodiments of the present invention, the endcap is coreless.

Furthermore, in accordance with some embodiments of the present invention, at least one of said first and second parts is an optical waveguide.

Furthermore, in accordance with some embodiments of the present invention, at least the part of said second part forming the protruding bonding area is furrowed or roughened for improving adhering of the endcap to another element.

Furthermore, in accordance with some embodiments of the present invention, the maximum diameter of the endcap is between 0.2 mm to 10 mm.

Furthermore, in accordance with some embodiments of the present invention, the length of the protruding bonding area of said second part, taken from the main axis is equal to or higher than twice the radius of the optical fiber.

In accordance with some embodiments of the present invention, there is provided an assembly for optical fibers, said assembly comprising:
  (i) a fixture apparatus comprising at least one fixture attachment area of a fixture apparatus; and
  (ii) an endcap comprising:
    a first part being at least partially symmetrical about a main axis, said first part being fused to an optical fiber at a proximal end thereof such that its main axis is alignable with an optical axis of the optical fiber beam; and
    a second part connecting to a distal end of said first part, said second part comprises a body and a protruding member which protrudes from said first part forming thereby a protruding bonding area, which is perpendicular to the main axis for attaching said endcap to the fixture attachment area of fixture apparatus, said fixture attachment area is perpendicular to said main axis,
wherein said endcap is inserted at least partially inside said fixture apparatus, whereby, said endcap maintains said optical fiber beam aligned and minimizes angular diversion from an original alignment.

Furthermore, in accordance with some embodiments of the present invention, the protruding bonding area of said endcap second part and the fixture attachment area of said fixture apparatus are counter facing, forming an engagement area and are bonded to one another using a bonding material.

Furthermore, in accordance with some embodiments of the present invention, the endcap and the fixture attachment area of said fixture apparatus are configured for attaching by interlocking to one another.

Furthermore, in accordance with some embodiments of the present invention, the second part of said endcap comprises an annular structure which is coaxially arranged about the main axis forming said protruding bonding area.

Furthermore, in accordance with some embodiments of the present invention, the body is coaxially arranged about the main axis.

Furthermore, in accordance with some embodiments of the present invention, the body is lensed shaped for collimating the fiber output beam.

Furthermore, in accordance with some embodiments of the present invention, the first part is smaller in diameter than said body.

Furthermore, in accordance with some embodiments of the present invention, all parts of said endcap form a single piece made of a transparent or semi-transparent material.

Furthermore, in accordance with some embodiments of the present invention, the endcap is made from glass or any other Silicon based material.

Furthermore, in accordance with some embodiments of the present invention, the fixture apparatus further comprises holes for receiving therein removable shims, said holes are separated from one another, wherein each of said holes is located such that once the endcap is inserted into the fixture apparatus, shims can be removably placed in the holes to mechanically fixate an equal vertical distance along the main axis in a gap formed between said bonding area of said endcap and the fixture attachment area of the fixture apparatus.

Furthermore, in accordance with some embodiments of the present invention, the fixture apparatus further comprises at least one duct directed to said engagement area for inserting a bonding material to said engagement area therethrough, for bonding said endcap to said fixture apparatus.

Furthermore, in accordance with some embodiments of the present invention, an ingress of each of said at least one duct is located below or above said engagement area and directed to said engagement area having an egress located at the engagement area.

Furthermore, in accordance with some embodiments of the present invention, the inner wall of said fixture apparatus comprises niches in areas in which the bonding material is to be inserted for allowing expansion of the bonding material outwardly in respect to said main axis for preventing vertical expansion thereof.

In accordance with some embodiments of the present invention, there is also provided a method comprising:
 a. providing an endcap and a fixture apparatus, said endcap being fused to one end of an optical fiber, wherein said endcap comprises at least one protruding part forming a protruding bonding area that is positioned perpendicularly in respect to a main axis which is alignable with an optical axis of the optical fiber attached thereto;
 b. engaging the protruding bonding area of the endcap to at least one counter facing fixture attachment area of a fixture apparatus, said fixture attachment area is perpendicular to said main axis
 c. inserting a bonding material to said engagement area for bonding said endcap to said fixture apparatus
whereby, mounting said endcap in a manner that maintains said optical fiber beam aligned and minimizes angular diversion from an original alignment.

Furthermore, in accordance with some embodiments of the present invention, the insertion of the bonding material to said engagement area is done via at least one duct in said fixture apparatus.

Furthermore, in accordance with some embodiments of the present invention, the method further comprising the step of mechanically maintaining the alignment between said fixture apparatus and said endcap while said bonding material is hardened by maintaining an equal distance "d" between the bonding area of said endcap and the counter-facing area of said protrusion of said fixture apparatus throughout the periphery of said engagement area in respect to the main axis of said endcap.

Furthermore, in accordance with some embodiments of the present invention, the method further comprising:
 inserting shims into holes in said fixture apparatus for mechanically maintaining the equal distance "d", said holes are separated from one another;
 removing the shims once the bonding material is hardened after the step of the insertion of the bonding material.

Furthermore, in accordance with some embodiments of the present invention, the shims are equal in shape and size.

Furthermore, in accordance with some embodiments of the present invention, the method further comprising the step of performing a durability test of the endcap and fixture alignment, after the bonding of said endcap to said fixture apparatus for testing the durability of the optical alignment between said fixture apparatus and said endcap, under one extreme influences.

Furthermore, in accordance with some embodiments of the present invention, the extreme influences used for the durability test is at least one of: extreme temperatures; extreme trembling or vibrating conditions.

Furthermore, in accordance with some embodiments of the present invention, the durability test is done using at least one optical system, wherein light is propagated through said optical fiber connecting to the endcap and beam outputted from said endcap is compared to a reference beam for detecting alignment accuracy rate of said endcap once bonded to said fixture apparatus.

BRIEF DESCRIPTION OF THE DRAWINGS

FIGS. 1A and 1B 1 show illustrations of two known in the art designs of endcaps attached to ferrule fixtures in a parallel attachment: FIG. 1A shows a cylindrical flattened edged endcap; and FIG. 1B shows a collimator endcap.

FIG. 5 schematically illustrates a method for improving accuracy in endcap-fixture alignment, according to some embodiments of the invention.

FIG. 6A shows a side cross-sectional view of the lensed endcap and fixture when engaged with one another and a syringe insertion device used for inserting a bonding material for bonding the endcap and fixture of the assembly; and FIG. 6B shows a top A-A section of the fixture and endcap shown in FIG. 6A.

FIG. 8A shows an isometric view of the assembly; and FIG. 8B shows a cross section B-B of the assembly.

DETAILED DESCRIPTION OF SOME EMBODIMENTS OF THE INVENTION

Figure 1A:
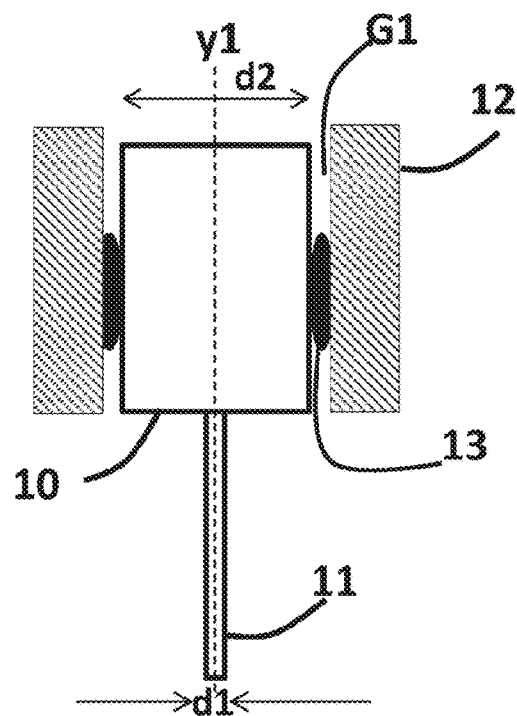
Figure 1B:
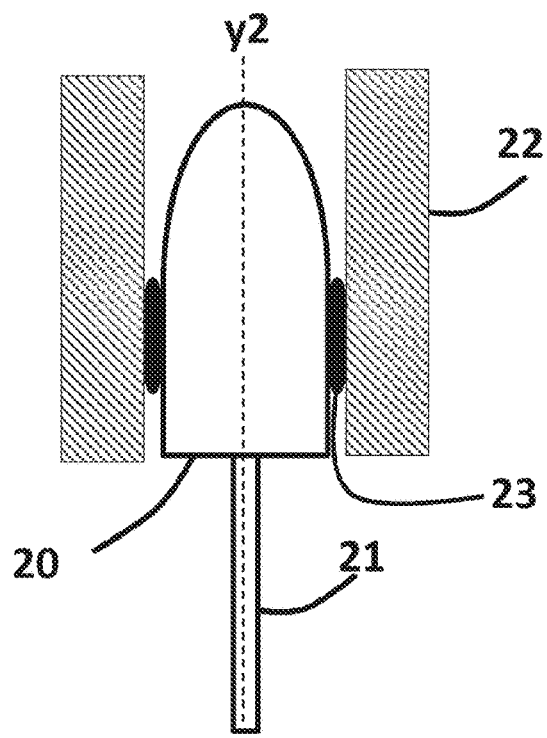

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

The present invention, in some embodiments thereof, provides innovative endcaps for optical fibers, fixtures for endcaps, endcap-fixture assemblies and methods for improving optical fiber-endcap-fixture alignment accuracy and for maintaining this alignment accuracy over time under various environmental conditions. The endcaps and fixtures of the present invention are configured for "perpendicular attachment" therebetween also referred to herein as "planar attachment" or "planar perpendicular attachment", for improving fiber-endcap-fixture alignment in respect to the optical axis formed by the optical fiber input or output beam. Maintaining a high fiber-endcap-fixture alignment accuracy can significantly reduce angular retention of the fiber output/input beam over time.

The endcaps, fixtures, endcap-fixture assemblies and methods of the present invention can be implemented in any optical system regardless of the alignment accuracy required or the input/output power rate. For example, the present invention can be implemented in systems using high input or output optical fiber power such as systems using power in the kilowatts scale, in which high alignment accuracy is required and also in systems requiring far lower power scales such as a few microwatts.

The present invention, in some embodiments thereof, provides an endcap for optical fibers that includes at least a first part being at least partially symmetrical about a main axis and a second part. The first part is configured for being attachable to an optical fiber at a proximal end thereof such that its main axis is alignable with the optical axis of the optical fiber input or output beam. The second part connects to the first part. The second part protrudes from the first part, such that it forms a "protruding bonding area", being perpendicular to the main axis, for perpendicularly attaching the endcap to another element. This configuration allows "perpendicular bonding" or "planar attachment" of the endcap to a fixture such as, yet not limited to, a ferrule housing element or a flattened element. The term perpendicular refers to a plane perpendicular to the "alignment axis" also referred to herein as the main axis, defined by the symmetry of the endcap and the optical axis of the fiber output beam.

The present invention, in some embodiments thereof, further provides a novel fixture for endcaps. The fixture of the present invention includes a housing configured for housing therein at least part of a fiber endcap; and at least one inner protrusion located over an inner wall of the housing forming a "fixture attachment area" designated for attaching a counter-facing bonding area of an endcap such that the engagement area between the inner protrusion of the fixture and attachment area of the endcap is perpendicular to a main axis of the endcap aligned with the optical axis of the fiber to which it couples.

The present invention, in some embodiments thereof, also provides an assembly for optical fibers that comprises: a fixture having one or more inner protrusions integrally connecting thereto or separately engaging thereof; and an endcap. The endcap of the assembly includes a first part and a second part, preferably, in a non-limiting manner, being integrally coupled to one another. The first part is configured for being attachable to an optical fiber at a proximal end thereof such that its main axis is alignable with the optical axis of the optical fiber input or output beam. In some embodiments, the second part integrally connects to the first part. The second part protrudes from the first part outer surface, such that it is perpendicular to the main axis of the first part, forming a protruding bonding area for perpendicularly attaching the endcap to the fixture. This configuration allows "perpendicular bonding" of the endcap to the fixture in respect to the "alignment axis" also referred to in this document as the "main axis" defined by the symmetry of the endcap and the optical axis of the fiber output beam.

The perpendicular endcap-fixture attachment (bonding) provided by the present invention, significantly decreases or even prevents the bonding material (used for the bonding of the endcap to the fixture), from spreading unevenly in respect to the vertical main axis e.g. under high temperature, since this perpendicular attachment allows the bonding material to spread perpendicularly across the bonding area.

Figure 2:
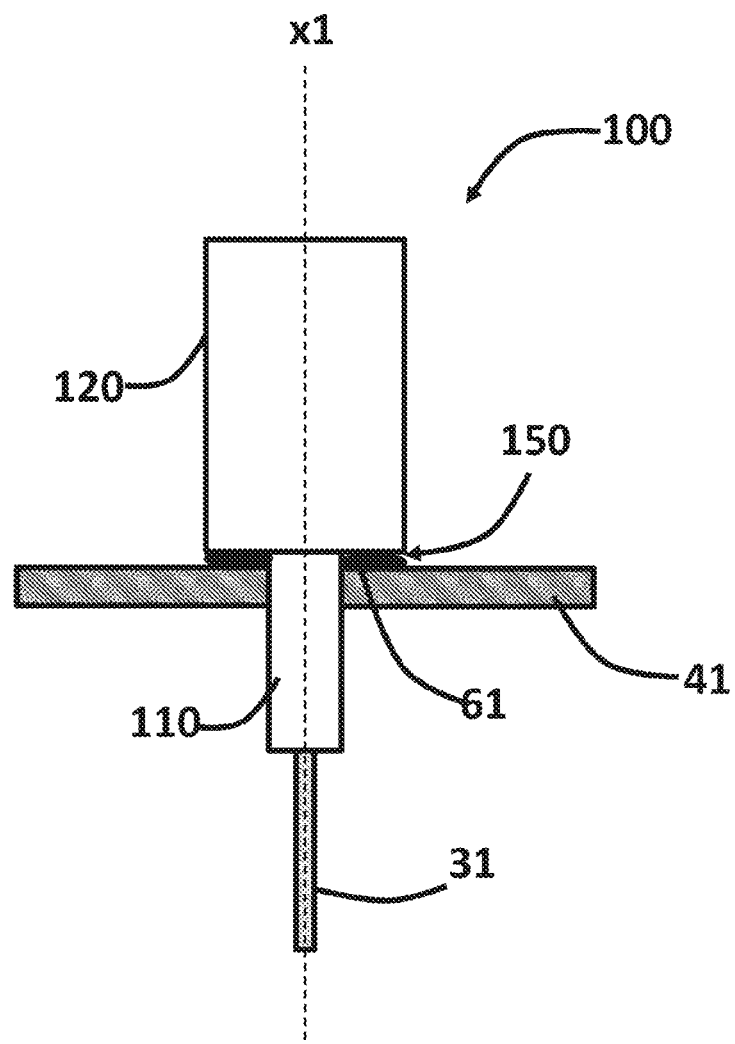
FIG. 2 shows a cross sectional view of a cylindrical endcap, according to some embodiments of the invention.
Figure 3A:
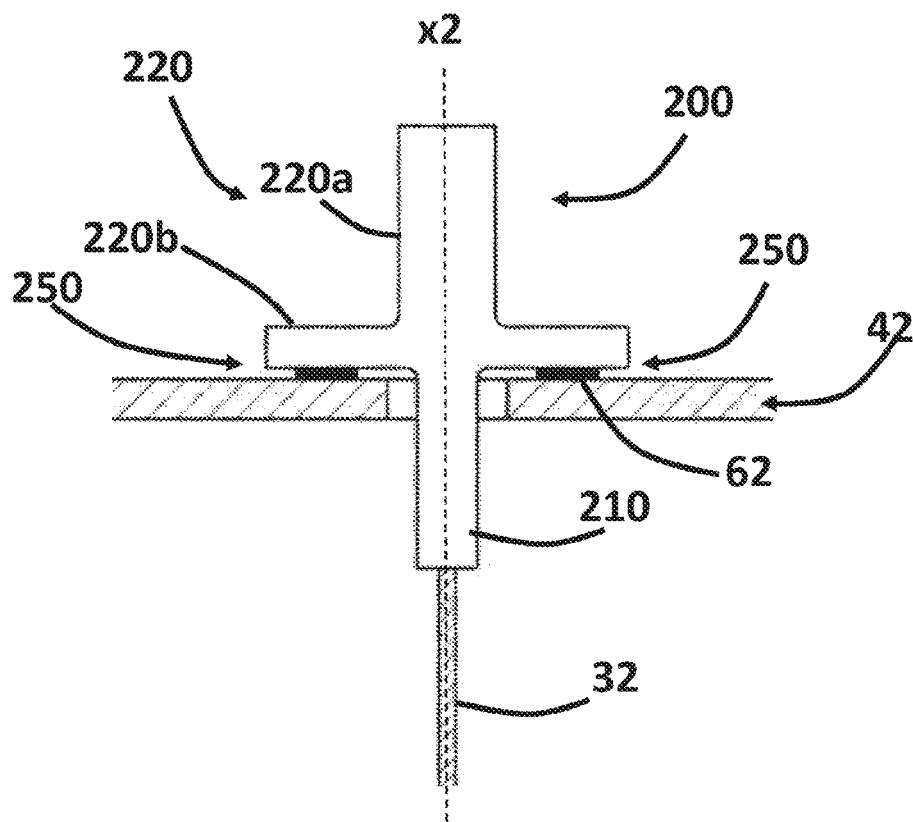
FIG. 3A shows a cross sectional view of a cylindrical endcap having an annular protrusion for forming a perpendicular bonding area, according to some embodiments of the invention.
Figure 3B:
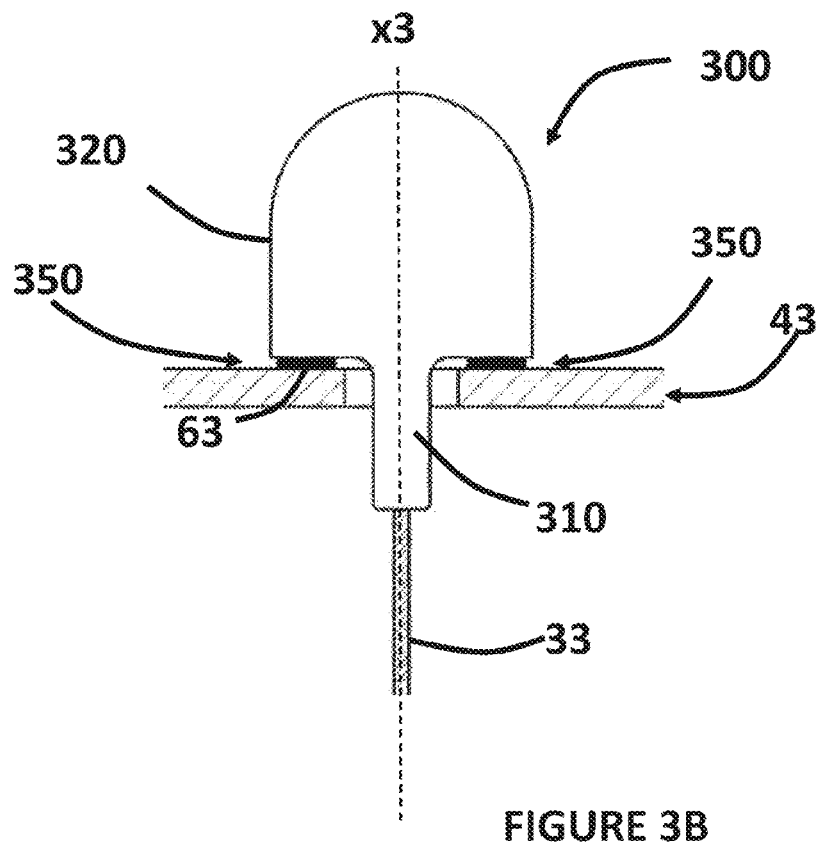
FIG. 3B shows a cross sectional view of a collimator endcap, according to some embodiments of the invention.

Reference is now made to FIGS. 2, 3A and 3B showing various endcaps designs of the present invention, all form a bonding area for attaching the endcap to a fixture or any other element via perpendicular attachment.

FIG. 2 shows a schematic illustration of a cylindrical endcap 100, according to some embodiments of the invention. The cylindrical endcap 100 has a first part 110 and a second part 120 integrally connecting to one another. Both first and second parts 110 and 120 are cylinders radially symmetrical about a main axis x1, alignable with an optical axis of an optical fiber 31 once attached (e.g. fused) to a proximal end of the first part 110, as illustrated in FIG. 2. The diameter of the cylinder of the first part 110 is smaller than the diameter of the second part 120, such as to form a flat annular bonding area 150 by the step formed at the connection between the first part 110 distal end and the second part 120 proximal end. This bonding area 150 is perpendicular to the main axis x1. The bonding area 150 is designated for attaching the endcap 100 to another element 41 such as a ferrule or any other fixture apparatus by any attaching means such as by using adhesives 61 for bonding the endcap 100 to the element 41.

FIG. 3A shows a schematic illustration of a cylindrical endcap 200, according to some embodiments of the invention. This endcap 200 includes a first part 210 attachable to an optical fiber 32 e.g. via fusion; and a second part 220 having a cylindrical body 220a and an annular protruding member 220b integrally connecting to the body 220a at its outer periphery. All parts of the endcap 200 i.e. the first part 210, and the body 220a and the annular protruding member 220b of the second part 220 are radially symmetrical about a main axis x2, where the main axis x2 is alignable with the optical axis of the optical fiber 32 output beam, once the endcap 200 is connected to the fiber 32.

As shown in FIG. 3A, the proximal end of the first part 210 can connect to an output or input end of the optical fiber 32 e.g. by fusion thereof, where the distal end of the first part 210 integrally connects to the body 220a of the second part 220. The diameter of the first part 210 is smaller than that of the body 220a. The annular protruding member 220b of the second part 220 is larger in diameter that both diameters of the first part 210 and the body 220a such that it protrudes also from the body 220a to form the bonding area 250 for connecting thereby to an element 42 such as a ferrule or any other fixture having a countering perpendicular bonding face, using adhesive means 62.

In other embodiments of the invention, the second part includes a main body, preferably symmetrically arranged about the main axis and multiple protrusions forming multiple perpendicular bonding areas, preferably also symmetrically arranged about the main axis. For example, multiple wing-like shaped protrusions having a flattened surface perpendicular to the main axis may be attached to the body forming the multiple bonding areas such that the adhesive means can be placed over the flat surface of the wings for perpendicular bonding of the endcap to a fixture comprising inner countering-perpendicular area(s).

FIG. 3B shows a collimator endcap 300, according to some embodiments of the invention. This endcap 300 has a cylindrical first part 310, and a second part 320 having a lens-shaped head forming a collimating lens for directing and collimating the optical beam therethrough. Both the first and second parts 310 and 320 are symmetrically arranged about a main axis x3, which is alignable with the optical axis formed by the optical fiber 33 attachable to the distal end of the endcap 300. The collimator lensed shaped second part 320 protrudes from the first part 310 by having a diameter larger than the diameter of the first part 310. The diameters difference between the first part 310 and the second part 320 forms a protruding bonding area 350, which is perpendicular to the main axis x3. The bonding area 350 formed allows perpendicular attachment of the endcap 300 to an element 43 such as a ferrule having a counter-facing perpendicular bonding area for engaging the bonding 350 area of the endcap 300.

For perpendicularly attaching the endcap 300 to the element 43 or to any other fixture, adhesive material 63 is placed (e.g. by injection) to the space between the bonding area 350 of the endcap 300 and the element bonding surface.

According to some embodiments of the invention, at least the part of the second part forming the protruding bonding area is furrowed or roughened for improving adhering of the endcap to the fixture element via the bonding material. In this configuration, since the surface area of the bonding area is increased, once the adhesives are introduced (e.g. injected) into the gap between the endcap perpendicular bonding area and the counter-facing area of the element to which the endcap is to be attached, the roughened area of the protruding part of the endcap allows the adhesive material (glue) to better grab on to this roughened area and therefore improve the bonding between the element (e.g. fixture such as ferrule) and the endcap.

Additionally or alternatively, the fixture bonding area(s), configured for counter-facing the protruding bonding area(s) of the endcap is/are roughened or furrowed for that same purpose of attachment improvement.

According to some embodiments, to permanently bond the endcap of the present invention to the fixture, the endcap is at least partially placed inside the fixture element and the fixture and endcap are held in a manner that ensures that the gap "d" between the surfaces of the endcap bonding area and the attachment area of the fixture is the same along the entire periphery of the endcap and fixture. This can be done by using mechanical means maintaining that equal gap "d" and/or by using optical devices when the optical fiber is already attached to the proximal end of the endcap for examining alignment properties of the optical beam outputted through the endcap and fixture when held together.

Once the endcap is held in a unified gap at the bonding area in the fixture, a bonding material such as an adhesive (glue) is introduced into this gap, e.g. by injection of an adhesive that hardens by curing or by any other means known in the art for bonding such components.

Figure 4:
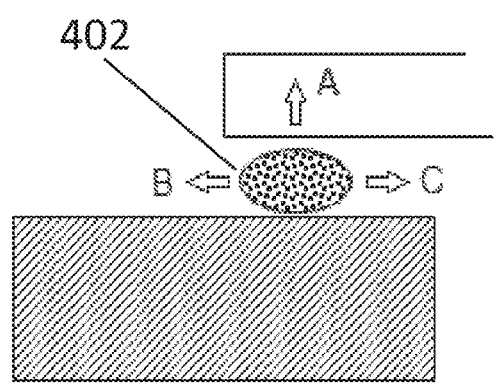
FIG. 4 illustrates the propagation directions of an adhesive at high temperatures.

FIG. 4 illustrates the propagation directions of adhesive 402 at high temperatures. Seen in the figure, adhesive 402 expands freely in directions B and C. Such free propagation in space does not affect/deviate the angle of the endcap. Also seen in the figure, adhesive 402 expands along the optical axis (direction A) which does not affect/deviate the angle of the endcap as well.

It should be noted that at cold temperatures the propagation direction is reversed (at cold temperatures adhesive 402 shrinks).

Thus, the endcap of the invention, i.e., an endcap, having a protruding bonding area perpendicular to the main axis to be attached to a counter-facing bonding area perpendicular to the main axis of a fixture apparatus, minimizes diversions from an original alignment due to thermal influences.

The endcap of the present invention is thus advantageous over prior-art endcaps which are attached to ferrule fixtures in a parallel attachment and as a result of which undergo a substantial angular deviation as the adhesive expands.

Exemplary adhesives that can be used are ultraviolet (UV) curable adhesive materials, Silicon based adhesives such as $SiO_2$ or dual components adhesives. Non silicon based materials that can be used are for example BK7, fluoride based glass, CaF, Chalcogenide based glasses such as AsS or AsSe and the like.

For mechanically maintaining that equal gap "G" between the bonding area of the endcap and the element area attaching thereto, throughout the periphery of the endcap, during the bonding process, shims can be placed, equally spaced from one another inside this gap. The shims may be equal in size and shape for that purpose.

Reference is now made to FIG. 5, schematically illustrating a method for improving accuracy in endcap-fiber-fixture alignment, according to some embodiments of the invention. According to these embodiments the endcap of the present invention and the fixture are engaged e.g. by placing the endcap inside the fixture, such that they are aligned in respect to the main axis thereof 71. In this engaged position the gap "G" is maintained equal throughout the engagement area between the fixture and the endcap to maintain alignment therebetween in respect to the main axis.

Optionally, to maintain this gap "G" removable shims may be placed between the endcap bonding area and the fixture engagement area 72. As mentioned above, the shims may be equal in shape and dimensions and may be equally spaced from one another.

Once the fixture and endcap are engaged and the gap "G" is maintained, a bonding material is introduced (inserted) into this gap for attaching (bonding) the endcap to the fixture 73. For example, a liquid or gel glue may be injected into the engagement area. This glue can be hardened 74 by curing or simply by drying depending on the bonding material used.

In cases in which shims are used for mechanically maintaining an equal distance "G" between the bonding area of the endcap and the fixture counter-facing area, the shims can be removed 75 after the bonding material is hardened or before the bonding material is fully hardened yet after some partial hardening thereof.

According to some embodiments, in cases in which the bonding area(s) are spaced and separated from one another, leaving areas along the periphery of the endcap bonding area that are not filled with bonding material, the shims can be located in the "clean spaces" where no bonding material is inserted to allow removal thereof after the bonding material is hardened (e.g. cured).

Figure 6A:
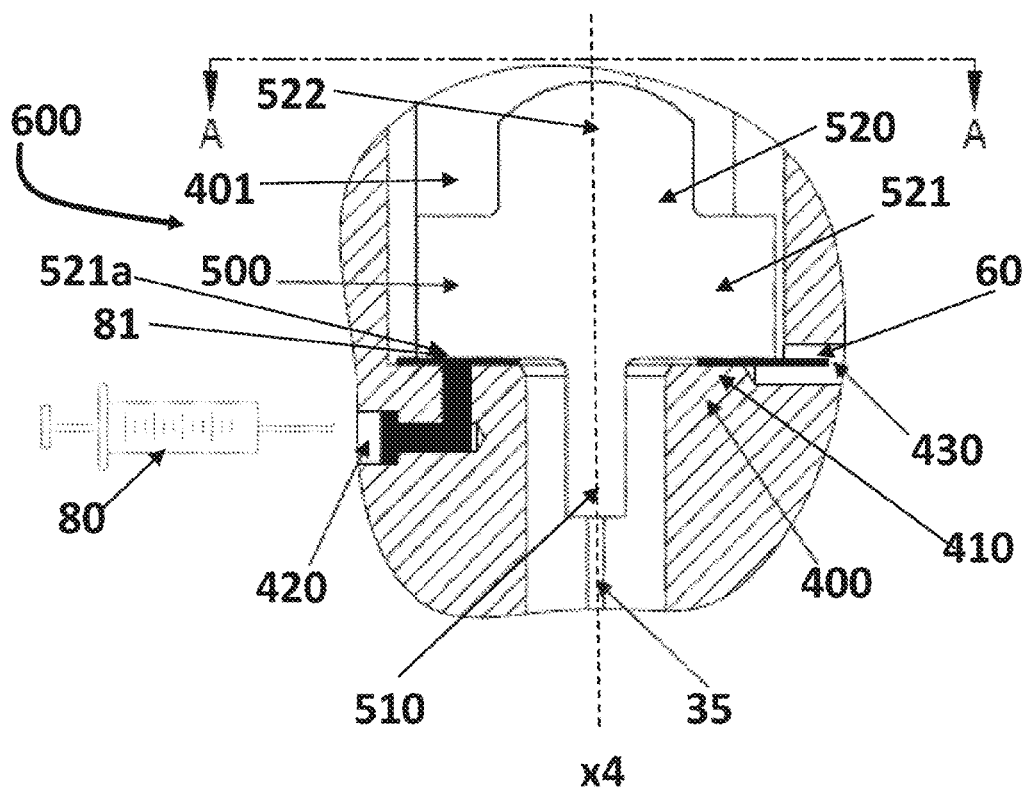
FIGS. 6A and 6B schematically illustrate a fixture and an endcap assembly and how the endcap can be engaged with the fixture and then bonded thereto, using shims, according to some embodiments of the fixture, endcap and methods of the present invention.
Figure 6B:
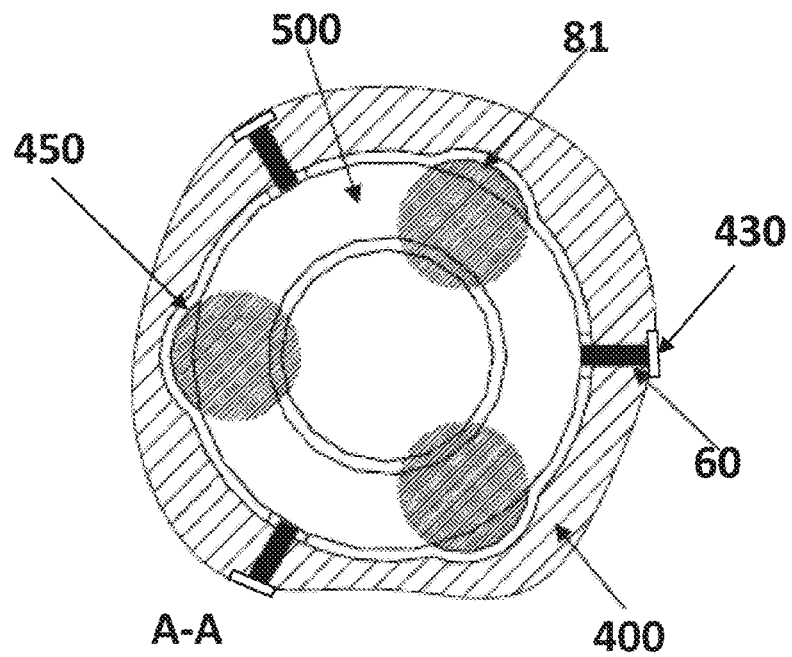

Reference is now made to FIGS. 6A and 6B, schematically illustrating how a fixture 400 and endcap 500 assembly 600 is created by attaching the endcap 500 to the fixture 400 using shims 60, according to some embodiments of the fixture, endcap and methods of the present invention.

The fixture 400 may be a ferrule or any other housing element configured for receiving the endcap 500 therein.

The endcap 500 has a first part 510 connecting to an optical fiber 35 at a proximal edge thereof, and a second part 520 integrally connecting to the distal edge of the first part 510. The second part 520 has a collimator head 522 and a protruding ring 521 connecting to the first part 510. The protruding ring 521 is larger in diameter than the diameter of the first part 510, forming the bonding area 521a for bonding with the fixture 400.

The fixture 400 includes an inlet 401, configured for receiving the endcap 500 therein. The fixture 400 inlet 401 is designed such that it has a wider recess for receiving the second part 520 of the endcap 500 therein and a narrower part for receiving therein the narrower first part 510 of the endcap 500 and fiber 35 attached thereto. The difference in widths in the inlet 401 forms a protrusion 410 which is used as the area counter-facing the bonding area 521a of the endcap 500.

According to some embodiments, as shown in FIGS. 6A and 6B, the fixture 400 also includes one or more ducts such as duct 420 for inserting the bonding material 81 therethrough using insertion means such as a syringe 80 for injecting liquid or gel bonding material thereby. The fixture 400 also includes holes 430 for inserting shims 60 therethrough.

FIG. 6B shows how the shims holes 430 are located such that they are equally spaced from one another and are separated from the engagement areas where the bonding material is placed. This allows easily removing the shims 60 once the bonding material 81 is hardened. The holes 430 are equal in diameter or at least in height (in case of non-cylindrical holes) for receiving therein equally shaped shims 60. The shims 60 may be longer than the lengths of the holes 430 to allow easy removal of the shims 60 therefrom.

Once the endcap 500 (attached to the fiber 35) is placed in the fixture 400, the shims 60 are inserted through the fixture holes 430 to maintain an equal gap between the bonding areas 521a of the endcap 500 and the protrusion 410 of the fixture 400, throughout the protrusion 410 periphery. Once the shims 60 are in the holes 430, the bonding material 81 can be injected through the duct(s) 420 into the bonding areas using the syringe 80. The duct 420 ingress is located below the protrusion 410 surface of the fixture 400.

Optionally, an initial alignment testing process may be performed before the bonding is done to ensure that the fixture 400 and endcap 500 are in alignment with one another in respect to a main axis x4, which is aligned with the optical axis of the optical fiber 35.

Once the fixture 400 and endcap 500 are bonded, the shims 60 can be removed from the holes 430 e.g. by mechanically gripping and pulling out each shim 60.

As shown in FIG. 6B, multiple (three) and equally spaced bonding areas are created by the design of the inner side of the fixture 400. The fixture 400 includes three separate niches 450 extending inwardly towards the inner wall of the fixture 400, each connecting to its own separate duct 420. The extending of the niches 450 inwardly allows the bonding material to expand over time outwardly in respect to the main axis x4, e.g. due to external thermal or movements influences, preventing the bonding material from expanding in the vertical axis parallel to the main axis x4. This outward expansion prevents the endcap 500 and fixture 400 from diverting from an original alignment therebetween, under influencing conditions that may change viscosity level of the bonding material such as temperature changes which may harden or melt the bonding material of trembling of the assembly 600 and the like.

According to some embodiments of the invention, once the fixture and endcap are bonded, one or more durability tests may be performed to verify that the alignment between the fixture and endcap is maintained under various alignment-influencing conditions such as under extreme temperatures or vibrating/quaking/shaking conditions. The alignment-influencing conditions may actually be conditions that influence the adhering properties of the bonding material and/or the ability of bonding areas of the fixture and/or endcap to adhere to the bonding material.

For example, the endcap-fixture-fiber assembly may be placed in an oven for heating the assembly and therefore the bonding material therein. During or immediately after the assembly was heated the optical output beam of the assembly can be optically measured for in respect to a reference beam for testing the alignment accuracy in respect to the alignment accuracy that was achieved before the heating of the assembly.

Similar tests can be made by measuring one or more alignment properties of the assembly before and after applying other extreme influencing conditions such as before and after shaking the assembly using mechanical shaking means and the like.

Figure 7:
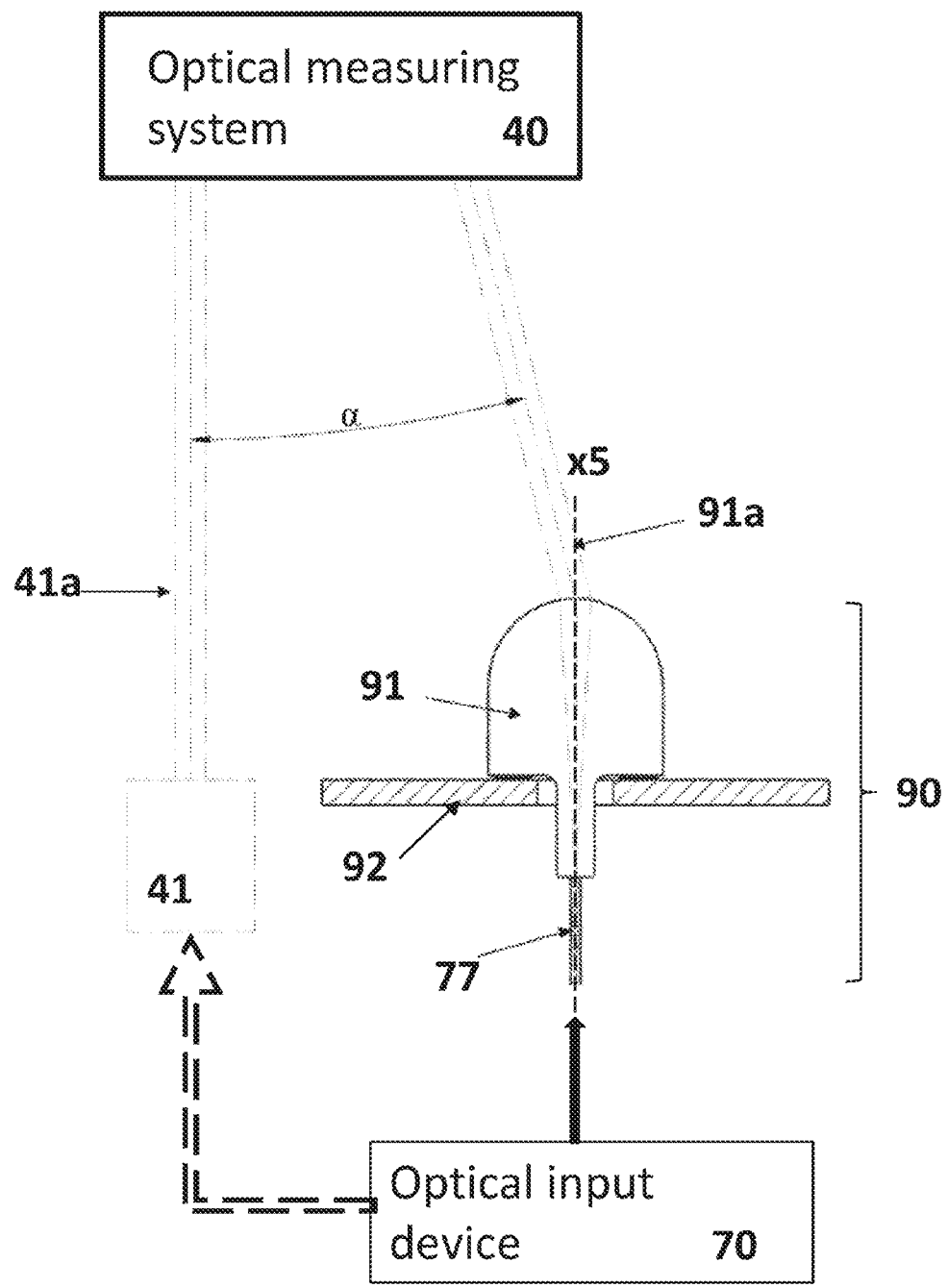
FIG. 7 shows a system for testing alignment accuracy durability of a fixture-endcap assembly, according to some embodiments of the invention.

Reference is now made to FIG. 7, schematically illustrating how a fixture-endcap assembly 90 is put to an optical durability test while the optical fiber 77 is attached to the endcap 91, according to some embodiments of the invention. In this case the endcap 91 is a collimator endcap having a lensed shaped second part.

A beam of light outputted by an optical input device 70 is directed through the optical fiber 77 attached to the endcap 91 outputted through the endcap as an endcap output beam 91a. This beam 91a is collimated by the endcap collimator head. The endcap output beam 91a is detected at an optical measuring system 40 placed at a known distance therefrom. A reference beam 41a is also simultaneously outputted either by a separate reference output device 41 or by using the same optical input device output beam directed by an optical beam splitter and optionally via one or more reflectors for instance. The reference beam 41a is directed in parallel to the original optical axis of the optical fiber 77.

The assembly 90 is heated before or during the measuring, where the optical measuring system 40 measures optical properties differences between the reference beam 41a and the endcap output beam 91a when the assembly 90 is heated to a predetermined temperature to check alignment of the fixture and endcap under heating conditions. The alignment accuracy of the assembly is indicative of the diversion of the endcap output beam 91a from the optical alignment axis x5. This diversion is indicated as an angle alpha "α", formed between the reference beam 41a and the endcap output beam 91a, wherein the value of the angle α is proportional to the inaccuracy level of the assembly, such that a high α value is indicative of a high alignment inaccuracy level. Another property that can be measured is the line-of-sight error in respect to the reference beam 41a. The optical measuring system 40 may include one or more optical devices and elements such as optical detectors.

Figure 8A:
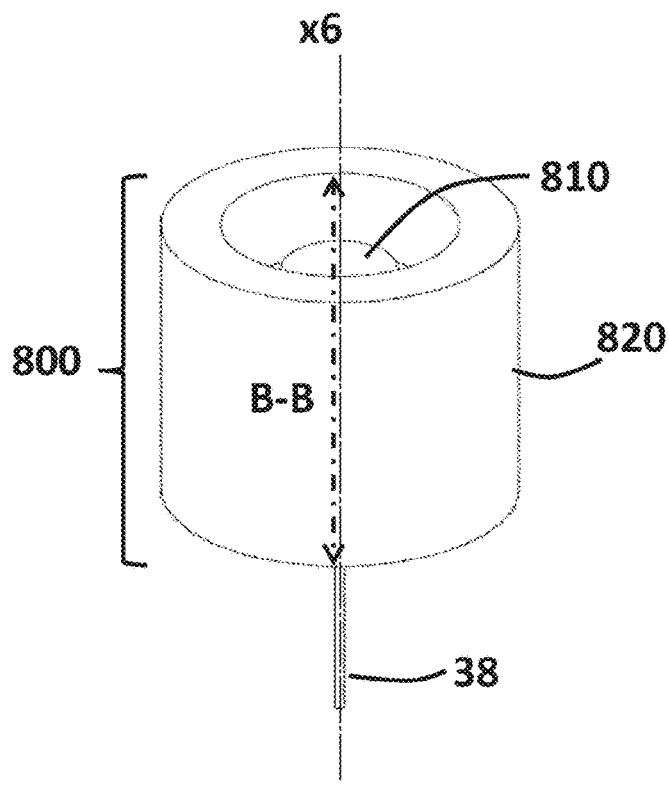
FIGS. 8A and 8B show an endcap-fixture assembly of some embodiments of the present invention perpendicularly attached to one another.
Figure 8B:
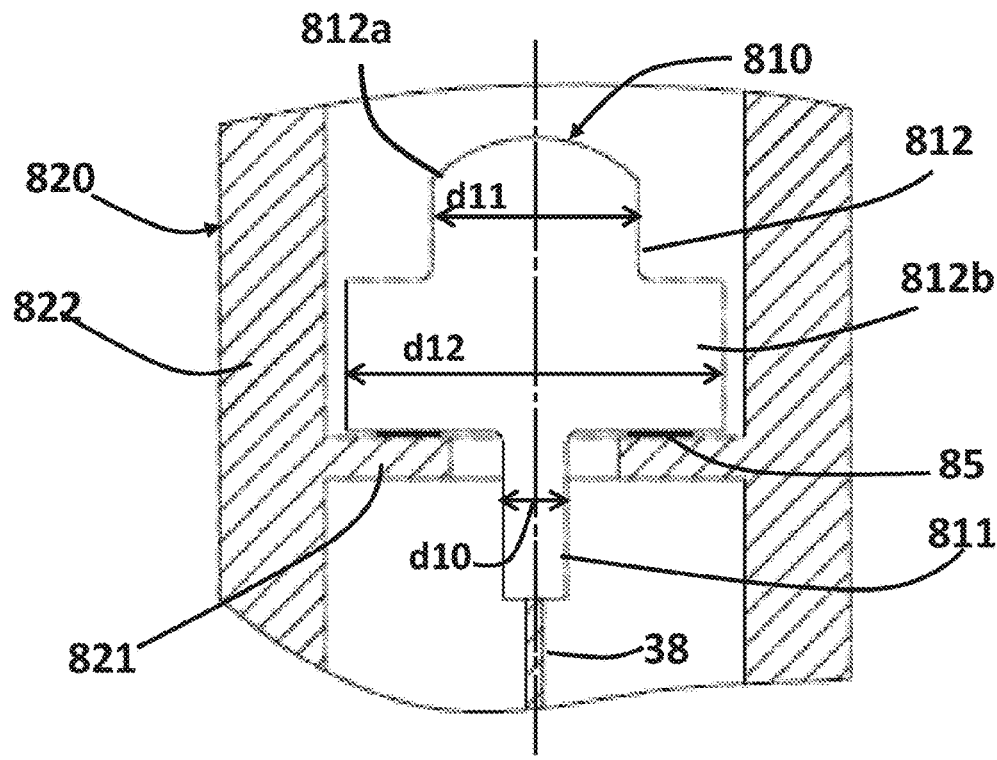

Reference is now made to FIGS. 8A and 8B, showing an endcap-fixture assembly 800 of some embodiments of the present invention perpendicularly attached to one another. The assembly 800 includes a collimator endcap 810 and a ferrule fixture 820 configured for housing the endcap 810 therein. The endcap 810 is attached at a proximal end thereof to an optical fiber 38. The endcap 810 is placed (inserted) into the ferrule fixture 820 from above.

As shown in the cross section B-B view in FIG. 8B, the endcap 810 has a first part 811 attached to the optical fiber 38 at a proximal end thereof, and a second part 812 both being symmetrical about a main axis x6. The endcap 810 has a collimator head 812a and a protruding flattened disc 812b, which protrudes from the collimator head 812a, forming a bonding area, which is perpendicular to the main axis x6 of the assembly 800. The collimator head 812a diameter d11 is larger than the diameter d10 of the first part 811 and the diameter d12 of the disc 812b is substantially larger than the diameter d11 of the collimator head 812a. For example, the diameter d10 of the first part 811 can be in the area of 1 mm while the diameter of the disc d12 can be in the area of 6-8 mm, whereas the diameter of the optical fiber 38 is in the area of 0.25 mm. This means that the protruding area can reach to a diameter or length that is up to 40 times or more the diameter of the optical fiber and 10 times or more the smallest diameter of the endcap to provide a large enough bonding area for the bonding material to be placed therein. The protruding disc 812b is symmetrically arranged about the main axis x6 and is perpendicular thereto.

As shown in FIG. 8B, the ferrule fixture 820 has a housing 821 of a cylindrical structure and an inner protrusion in the shape of a flattened ring 822 integrally connected to the inner wall of the housing 821. The protruding ring 822 is symmetrical about the main axis x6 and is perpendicular thereto. When the endcap 810 is inserted into the ferrule fixture 820 the lower part of the protruding disc 812b of the endcap 810 engages or faces the upper face of the protruding ring 822 of the ferrule fixture 820 allowing introducing a bonding material 85 therebetween for perpendicularly attaching the endcap 810 to the ferrule fixture 820.

The endcaps of the present invention may be in any shape and size adapted to utilization thereof in designated optical system, provided that they include the perpendicularly protruding bonding area for perpendicular engaging thereof with an element designated for fixating and/or holding thereof. The endcaps may be made of any material known in the art whether of transparent, semi-transparent or non-transparent properties.

The size of the parts of the endcap of the present invention may be adapted to optical requirements and configurations such as to the diameter and wavelength band of the optical fiber(s) types to which the endcap is designed to attach to and requirements of the optical system in which the fiber and endcap are used.

The fixture elements of the present invention can be in any size and shape depending, inter alia, on the size and shape of the endcap with which they are to engage.

The bonding material used for bonding the endcap to the fixture can be any bonding material known in the art such as various types of epoxy glues hardening by mixing two adhesives or any other adhesive material known in the art that can be delivered when in the state of powder, liquid, gel or cream that can be inserted by being injected or spread.

Empirical results show a significant improvement in the average angular retention under environmental conditions such as trembling or temperature changes: when using prior art standard endcaps having a maximal diameter of 1 mm, using parallel attachment between the ferrule and the endcap—the average angular retention was 200 μRad. When using endcaps and ferrules of the present invention, where the endcaps' maximum diameter in the bonding area thereof ranged between 6-10 mm, using perpendicular planer attachment between the ferrule and the endcap, the average angular retention was 50 μRad. In both experiments (using prior art endcaps and ferules and using endcaps and ferrules of the present invention) we used output beam wavelength of 1064 nm and a 1 mm optical fiber diameter. It clear from the preliminary experimental results that when using perpendicular attachment using a ratio between the maximal endcap diameter and the optical fiber diameter that exceeds 2 (reaching up to 10 in this case), a much higher alignment accuracy and duration thereof can be achieved under various external conditions. The maximal length of the protruding bonding area of the endcap of the present invention taken from the main axis (center of the endcap) should be therefore longer than twice the radius of the optical fiber. For instance, when using a perpendicular attachment, using a 1 mm optical fiber diameter i.e. a 0.5 mm radius, the length of the protruding bonding area part(s) should be higher than 1 mm and preferably significantly higher than this threshold.

The invention claimed is:

1. An endcap comprising:
    a. a first part being at least partially symmetrical about a main axis, said first part being fused to an optical fiber at a proximal end thereof such that said main axis is alignable with an optical axis of the optical fiber beam; and
    b. a second part connecting to said first part at a distal end of said first part, wherein said second part protrudes from said first part, such that said second part forms a protruding bonding area, which is perpendicular to said main axis, for attaching said endcap to a fixture attachment area of a fixture apparatus, said fixture attachment area is perpendicular to said main axis,
    wherein said endcap is inserted at least partially inside said fixture apparatus,
    whereby, said endcap keeps said optical fiber beam aligned and minimizes angular diversion from an original alignment.

2. The endcap of claim 1, wherein said endcap and said fixture apparatus are held in a manner that the surface of the protruding bonding area of the endcap is bonded to the counter facing surface of the fixture attachment area by a bonding material in a manner that allows thermal expansion movements of said bonding material along said optical axis.

3. The endcap according to claim 1, wherein said second part is lens-shaped at a distal end thereof, forming a collimator for collimating the optical fiber beam, said second part comprises:
    a body symmetrically arranged about said main axis; and
    at least one protruding member integrally connected to said body, over an outer periphery of said body, said at least one protruding member protrudes perpendicularly to said main axis,
    wherein said protruding member forms the bonding area of said second part.

4. The endcap according to claim 3, wherein said at least one protruding member of said second part is either a single annular ring connected to the outer periphery of said body or comprises multiple protruding wings each forming a bonding area, which is perpendicular to said main axis, wherein said protruding wings are symmetrically arranged about said main axis and are spaced from one another.

5. The endcap according to claim 4, wherein said body of said second part is cylindrical having flattened edges or has a lensed shaped edge for collimating the optical fiber beam.

6. The endcap according to claim 1, wherein at least one of said first and second parts is an optical waveguide.

7. An assembly for optical fibers, said assembly comprising:
    (i) a fixture apparatus comprising at least one fixture attachment area of a fixture apparatus; and
    (ii) an endcap comprising:
    a first part being at least partially symmetrical about a main axis, said first part being fused to an optical fiber at a proximal end thereof such that its main axis is alignable with an optical axis of the optical fiber beam; and
    a second part connecting to a distal end of said first part, said second part comprises a body and a protruding member which protrudes from said first part forming thereby a protruding bonding area, which is perpendicular to the main axis for attaching said endcap to the fixture attachment area of a fixture apparatus, said fixture attachment area is perpendicular to said main axis, wherein said endcap is inserted at least partially inside said fixture apparatus, whereby, said endcap maintains said optical fiber beam aligned and minimizes angular diversion from an original alignment.

8. The assembly of claim 7, wherein said protruding bonding area of said endcap second part and the fixture attachment area of said fixture apparatus are counter facing, forming an engagement area and are bonded to one another using a bonding material.

9. The assembly according to claim 7, wherein said endcap and the fixture attachment area of said fixture apparatus are configured for attaching by interlocking to one another.

10. The assembly according to claim 7, wherein said second part of said endcap comprises an annular structure which is coaxially arranged about the main axis forming said protruding bonding area.

11. The assembly according to claim 10, wherein said body being coaxially arranged about the main axis, said first part is smaller in diameter than said body, and said body is lensed shaped for collimating the fiber output beam.

12. The assembly according to claim 7, wherein said fixture apparatus further comprises at least one duct directed to said engagement area for inserting a bonding material to said engagement area therethrough, for bonding said endcap to said fixture apparatus.

13. The assembly according to claim 12, wherein an ingress of each of said at least one duct is located below or above said engagement area and directed to said engagement area having an egress located at the engagement area.

14. The assembly according to claim 12, wherein the inner wall of said fixture apparatus comprises niches in areas in which the bonding material is to be inserted for allowing expansion of the bonding material outwardly in respect to said main axis for preventing vertical expansion thereof.

15. A method comprising:
a. providing an endcap and a fixture apparatus, said endcap being fused to one end of an optical fiber, wherein said endcap comprises at least one protruding part forming a protruding bonding area that is positioned perpendicularly in respect to a main axis which is alignable with an optical axis of the optical fiber attached thereto;
b. engaging the protruding bonding area of the endcap to at least one counter facing fixture attachment area of a fixture apparatus, said fixture attachment area is perpendicular to said main axis
c. inserting a bonding material to said engagement area for bonding said endcap to said fixture apparatus
whereby, mounting said endcap in a manner that maintains said optical fiber beam aligned and minimizes angular diversion from an original alignment.

16. The method according to claim 15, wherein said insertion of the bonding material to said engagement area is done via at least one duct in said fixture apparatus.

17. The method according to claim 15 further comprising the step of mechanically maintaining the alignment between said fixture apparatus and said endcap while said bonding material is hardened by maintaining an equal distance "d" between the bonding area of said endcap and the counter-facing area of said protrusion of said fixture apparatus throughout the periphery of said engagement area in respect to the main axis of said endcap.

18. The method according to claim 17 further comprising:
inserting shims into holes in said fixture apparatus for mechanically maintaining the equal distance "d", said holes are separated from one another;
removing the shims once the bonding material is hardened after the step of the insertion of the bonding material.

19. The method according to claim 15 further comprising the step of performing a durability test of the endcap and fixture alignment, after the bonding of said endcap to said fixture apparatus for testing the durability of the optical alignment between said fixture apparatus and said endcap, under one extreme influences.

20. The method according to claim 19, wherein said durability test is done using at least one optical system, wherein light is propagated through said optical fiber connecting to said endcap and beam outputted from said endcap is compared to a reference beam for detecting alignment accuracy rate of said endcap once bonded to said fixture apparatus.

* * * * *